United States Patent
Jeon

(10) Patent No.: US 9,444,087 B1
(45) Date of Patent: Sep. 13, 2016

(54) ENBLOC CLIP-TYPE LITHIUM SECONDARY BATTERY PACK CAPABLE OF FITTING INTO TWO-CELL OR FOUR CELL BATTERY COMPARTMENT OF ELECTRONIC DEVICE

(71) Applicant: ENBLOC CELL LLC, Ansan (KR)

(72) Inventor: Jeong Bae Jeon, Anyang (KR)

(73) Assignee: ENBLOC CELL LLC, Ansan (KR)

( * ) Notice: Subject to any disclaimer, the term of this patent is extended or adjusted under 35 U.S.C. 154(b) by 0 days.

(21) Appl. No.: 14/895,924

(22) PCT Filed: Jun. 13, 2014

(86) PCT No.: PCT/KR2014/005224
§ 371 (c)(1),
(2) Date: Dec. 3, 2015

(87) PCT Pub. No.: WO2015/083912
PCT Pub. Date: Jun. 11, 2015

(30) Foreign Application Priority Data

Dec. 5, 2013 (KR) .................... 10-2013-0150990

(51) Int. Cl.
| | | |
|---|---|---|
| *H01M 2/02* | (2006.01) | |
| *H01M 10/0525* | (2010.01) | |
| *H01M 2/26* | (2006.01) | |
| *H01M 10/0587* | (2010.01) | |
| *H01M 2/30* | (2006.01) | |
| *H01M 10/42* | (2006.01) | |

(52) U.S. Cl.
CPC ............ *H01M 2/263* (2013.01); *H01M 2/022* (2013.01); *H01M 2/30* (2013.01); *H01M 10/0525* (2013.01); *H01M 10/0587* (2013.01); *H01M 10/425* (2013.01); *H01M 2010/4271* (2013.01); *H01M 2220/30* (2013.01)

(58) Field of Classification Search
CPC .. H01M 2/022; H01M 2/0242; H01M 2/026; H01M 2/1016; H01M 2/1022; H01M 2/105; H01M 2/1055; H01M 2/1077; H01M 2/20; H01M 2/202; H01M 2/204; H01M 2/22; H01M 2/263; H01M 2/30; H01M 10/0422; H01M 10/0525; H01M 10/0587; H01M 10/425; H01M 10/4257; H01M 2220/30
See application file for complete search history.

(56) References Cited

FOREIGN PATENT DOCUMENTS

| JP | 2005520313 A | 7/2005 |
|---|---|---|
| JP | 2008135374 A | 6/2008 |
| JP | 2010135170 A | 6/2010 |
| KR | 1020020025472 A | 9/2002 |
| KR | 1020020070653 | 5/2004 |

*Primary Examiner* — Carlos Barcena
(74) *Attorney, Agent, or Firm* — STIP Law Group, LLC

(57) ABSTRACT

The present invention provides an enbloc clip-type lithium secondary battery pack capable of fitting into a four-cell (R6 standards cells) battery compartment of an electronic camera flash. The enbloc clip-type lithium secondary battery pack can increase an electric supply capacity (Wh) two times or more compared to a conventional low self-discharge nickel hydride batteries, thereby making it unnecessary to use a quick recycling battery pack or an external battery pack. Therefore, the enbloc clip-type lithium secondary battery pack can reduce the weight and cost of camera equipment.

6 Claims, 7 Drawing Sheets

ENBLOC CLIP-TYPE LITHIUM SECONDARY BATTERY PACK CAPABLE OF FITTING INTO TWO-CELL OR FOUR CELL BATTERY COMPARTMENT OF ELECTRONIC DEVICE

CROSS-REFERENCE TO RELATED APPLICATIONS

This application is the U.S. National Phase under 35 U.S.C. §371 of International Application No. PCT/KR2014/005224 filed on Jun. 13, 2014, which in turn claims the benefit of Korean Application No. 10-2013-0150990, filed on Dec. 5, 2013, the disclosures of which are incorporated by reference into the present application.

TECHNICAL FIELD

The present invention relates to a technology of a secondary cell and, more particularly, to an enbloc clip-type lithium secondary battery pack capable of fitting into a two-cell or four-cell battery compartment of the electronic devices, such as an electronic flash (or strobe light) for a camera, which uses R6 (or AA) cells of IEC standards.

BACKGROUND ART

Portable electronic devices such as smart phones, tablet computers, laptop computers, and digital cameras usually consume a large amount of electricity. Therefore, nowadays, these electronic devices typically use a high-capacity dedicated lithium-ion (Li-ion) battery pack or lithium-ion polymer (Li-Po) battery pack, rather than primary cells (or disposable batteries) that are not rechargeable, or rather than nickel-metal hydride (Ni-MH) batteries that have a small rated capacity. Nowadays, in the field of some electronic devices such as portable flashlights that consume a large amount of electricity and that have a short product lifecycle, have been launched new products that are in compliance with 18650 standards of most-widely used cylindrical lithium-ion batteries.

Although electronic flash for cameras suffer very high power consumption, they still use a conventional battery in which commercial R6 (or AA) cells are connected in series, rather than a high-capacity dedicated battery pack. This is because the product lifecycle of camera flashes is relatively long (for example, 10 years or more) and compatibility with commercial batteries should be considered. For the same reason, camera flash manufacturers have restricted compatible batteries for their camera flashes to only four types: 1.5 V alkaline primary batteries; 1.5 V lithium primary (lithium iron disulfide or LiFeS2) batteries; 1.2 V nickel-metal hydride (Ni-MH) secondary batteries; and 1.2 V low self-discharge (LSD) Ni-MH secondary batteries.

An alkaline battery, which is one type of primary cell, is vulnerable to low temperature conditions. For example, the discharge capacity of an alkaline battery is reduced to about 60% of the rated capacity (about 2500 mAh) at −10° C. and reduced to about 20% of the rated capacity at −20° C. Furthermore, all the rated capacity (2500 mAh) can be fully used under a low drain condition of about 25 mA, but only less than half of the rated capacity (for example, 1000 mAh) can be used under a high drain condition of about 1000 mA. In other words, alkaline batteries are unsuitable for camera flashes because camera flashes are usually used under outdoor low temperature conditions and have very high power consumption. On the other hand, lithium primary batteries can be used stably at a rated capacity of about 3000 mAh even under low temperature and high drain conditions. However, the consumer price of lithium primary batteries is about eight times that compared to alkaline batteries, and thus are very expensive. In addition, because the above-mentioned two kinds of primary batteries cannot be recharged or reused, they are neither cost effective nor environment-friendly.

High-capacity nickel hydride batteries, one type of secondary batteries, have a rated capacity of about 2700 mAh, which is substantially equal to that of alkaline batteries or lithium primary batteries. However, high-capacity nickel hydride batteries have a high self-discharge rate, and frequently experience voltage depressions known as memory effect under high drain conditions. Therefore, at present, high-power consumption flashes rarely use high-capacity nickel hydride batteries. On the other hand, there are low self-discharge nickel hydride batteries that are free of the above-mentioned problems. However, these low self-discharge nickel hydride batteries have a problem of a low rated capacity of about 2000 mAh, which is approximately 26% lower than that of conventional high-capacity nickel hydride batteries. In order to supplement the lack electricity of low self-discharge nickel hydride batteries, camera flash manufacturers additionally provide customers with a quick recycling battery pack that can increase a supply voltage by which one R6 standards battery can be connected in series with battery compartment, or they separately sell an external battery pack in which six or eight R6 standards batteries are connected in series. This, however, results in an increase in cost and weight of camera equipment, which is undesirable.

Alkaline batteries or lithium primary batteries that are generally used for camera flashes have a rated voltage of 1.5 V, an open circuit voltage of 1.65 V, and an end of discharge voltage of 1.1 V. When four alkaline batteries or four lithium primary batteries are connected in series, they supply a voltage ranging from 4.4 to 6.6 V. On the other hand, when five alkaline batteries or five lithium primary batteries are connected in series by additionally using a quick recycling battery pack, they supply a voltage ranging from 5.5 to 8.25 V. On the other hand, lithium-ion batteries have a rated voltage of 3.6 to 3.7 V, a maximum charging voltage of 4.2 V, and a discharge cut-off voltage of 2.8 V. Therefore, it is impossible to apply cylindrical lithium-ion batteries with 14500 standards (the same as those of R6) to a 4-series (4S) circuit of a four-cell battery compartment in a camera flash. However, when lithium-ion batteries or lithium-ion polymer batteries each with 14500 standards are connected to be a 2-series & 2-parallel (2S2P) circuit, a voltage ranging from 5.6 to 8.4 V can be supplied. On the other hand, lithium iron phosphate batteries (LiFePO4) have a rated voltage of 3.2 V, a maximum charging voltage of 3.6 V and a discharge cut-off voltage of 2.8 V. When lithium iron phosphate batteries are connected to be a 2-series & 2-parallel (2S2P) circuit, a voltage ranging from 5.6 to 7.2 V can be supplied. Therefore, in such a case, lithium-ion batteries, lithium-ion polymer batteries, or lithium iron phosphate batteries can be used for a camera flash. In addition, lithium-ion batteries have 2 to 3 times more specific energy and energy density than nickel hydride batteries. Furthermore, lithium-ion batteries have high charge/discharge efficiency (90% or higher) compared to nickel hydride batteries having charge/discharge efficiency of about 65%. When a lithium-ion battery and a nickel hydride battery are the same in volumes or specifications, the weight of a lithium-ion battery is only half the weight of a nickel hydride battery.

However, all lithium secondary battery packs designed and marketed thus far are prismatic types or pouch types having an elongated flat shape. Or packaged two or more cylindrical type lithium-ion bare cells (each contained in a metal can) are simply connected to a protection circuit module (PCM) and fixed in an outer case. Therefore, it is impossible to insert and install those lithium secondary battery packs into a four-R6-standards-cell battery compartment of a camera flash. Furthermore, a cylindrical pouch-type bare cell having a Jelly roll-type electrode assembly has not yet been developed, manufactured, or marketed, which is needed to produce a lithium secondary battery pack that can fit snugly into a two-cell or four-cell (R6 standards cells) battery compartment of the electronic devices.

DISCLOSURE

Technical Problem

Accordingly, the present invention has been made keeping in mind the above problems occurring in the prior art, and an object of the present invention is intended to propose an enbloc clip-type lithium secondary battery pack capable of fitting into a two-cell or four-cell (R6 standards cells) battery compartment of the electronic devices such as electronic flashes for camera, thereby increasing an electric supply capacity (Wh) two times or more compared to using low self-discharge nickel hydride batteries.

Unlike a conventional method in which two or four (R6 standards) batteries are individually installed, the present invention provides a battery pack that can be installed more easily, wherein the battery pack is modularized as an enbloc clip-type unit that can fit snugly into a two-cell or four-cell (R6 standards cells) battery compartment of the electronic devices.

Technical Solution

In order to achieve the above object, according to one aspect of the present invention, there is provided an enbloc clip-type lithium secondary battery pack capable of fitting snugly into a two-cell or four-cell battery compartment of the electronic devices, the lithium secondary battery pack including:

a cylindrical pouch-type bare cell including a cylindrical jelly roll-type electrode assembly and a cylindrical pouch that accommodates the cylindrical jelly roll-type electrode assembly therein, the cylindrical jelly roll-type electrode assembly including a first electrode tab and a second electrode tab, in which the first electrode tab protrudes by a predetermined length, the second electrode tab is elongated by a length longer than the length of the first electrode tab, the first electrode tab is bonded to a first electrode coated with any one of a positive electrode material and a negative electrode material, and the second electrode tab is bonded to a second electrode coated with a remaining one of the positive electrode material and the negative electrode material, in which the first electrode tab and the second electrode tab are located in opposite positions, and in which when the second electrode tab is folded in a direction toward the first electrode tab, the heights of the first electrode tab and the second electrode tab become same;

an enbloc clip-type outer case structured such that one ends of several cylindrical outer cases are continuously connected to each other by a protection circuit module compartment, in which the several cylindrical outer cases accommodate the respective cylindrical pouch-type bare cells therein, and the protection circuit module compartment connects the one ends of the several cylindrical outer cases to each other;

a protection circuit module that is electrically connected to the first electrode tab and the second electrode tab, wherein the first electrode tab and the second electrode tab is installed in the respective several cylindrical pouch-type bare cells, and after each of the cylindrical pouch-type bare cells are inserted and installed in the respective several cylindrical outer cases such that the first electrode tab and the second electrode tab are directed toward the protection circuit module compartment, in which the second electrode tab is folded in the direction toward the first electrode tab; and a pair of external terminal assemblies including an external positive terminal or an external negative terminal and individually including outer electrode tabs, wherein the external positive terminal and the external negative terminal are received in the enbloc clip-type outer case, and each of the outer electrode tabs is electrically connected to the external positive terminal or the external negative terminal, and the outer electrode tabs are inserted into the enbloc clip-type outer case, and each of the outer electrode tabs is electrically connected to the protection circuit module.

Each of the pair of external terminal assemblies may include an external terminal fixing groove and an external terminal fixing tongue that are engaged snugly with each other, wherein the external terminal fixing groove is provided on each of the external positive terminal and the external negative terminal, and the external terminal fixing tongue is provided on the enbloc clip-type outer case.

Each of the pair of external terminal assemblies may include an external terminal compartment in which the external positive terminal or the external negative terminal is inserted.

The protection circuit module compartment may be equipped with the protection circuit module.

Each of the pair of external terminal assemblies may include an external terminal fixing cap that is combined snugly with both the external positive terminal or the external negative terminal and the external terminal compartment.

The protection circuit module compartment may further include a rear cap that is combined snugly with the protection circuit module compartment after the protection circuit module has been inserted into the protection circuit module compartment.

Advantageous Effects

According to the present invention, as described above, the enbloc clip-type lithium secondary battery pack capable of fitting snugly into a four-cell (R6 standards cells) battery compartment of an electronic camera flash can increase the electric supply capacity (Wh) two times or more compared to low self-discharge nickel hydride batteries, thereby making it unnecessary to use a quick recycling battery pack or an external battery pack. Therefore, the enbloc clip-type lithium secondary battery pack according to the present invention can reduce the weight and cost of camera equipment.

In addition, unlike a method in which two or four R6 standards batteries are individually installed in an electronic device, in the present invention, a battery pack is modularized as an enbloc clip-type such that the battery pack can fit snugly into a two-cell or four-cell (R6 standards cells) battery compartment. Therefore, it is easy to install batteries in electronic devices.

In addition, according to the present invention, since the cylindrical pouch-type bare cell is manufactured using a jelly roll-type electrode assembly that has been used to manufacture a cylindrical bare cell with 14500 standards that is contained in a metal can, cost and process steps for manufacturing a battery pack can be reduced. Furthermore, the weight of a bare cell manufactured according to the present invention is dramatically reduced compared to a bare cell using a metal can.

In addition, unlike the case of manufacturing a bare cell using a metal can, the cylindrical pouch-type bare cell having a positive tab that protrudes by a predetermined length and a negative tab that is elongated by a length longer than the length of the positive tab, can be inserted into an enbloc clip-type R6 standards outer case. Therefore, when the bare cells are connected to a protection circuit module, various combinations of a series connection and a parallel connection are possible. For this reason, it is possible to manufacture a lithium secondary battery pack that is compatible with commercial batteries in terms of the rated voltage.

In addition, since the enbloc clip-type outer case is manufactured as an integrated body through pressure injection molding of a polycarbonate resin, and the battery packs are manufactured through assembling of modularized elements, it is possible to simplify the manufacturing process and reduce manufacturing cost.

DESCRIPTION OF THE REFERENCE NUMERALS IN THE DRAWINGS

Figure 1:
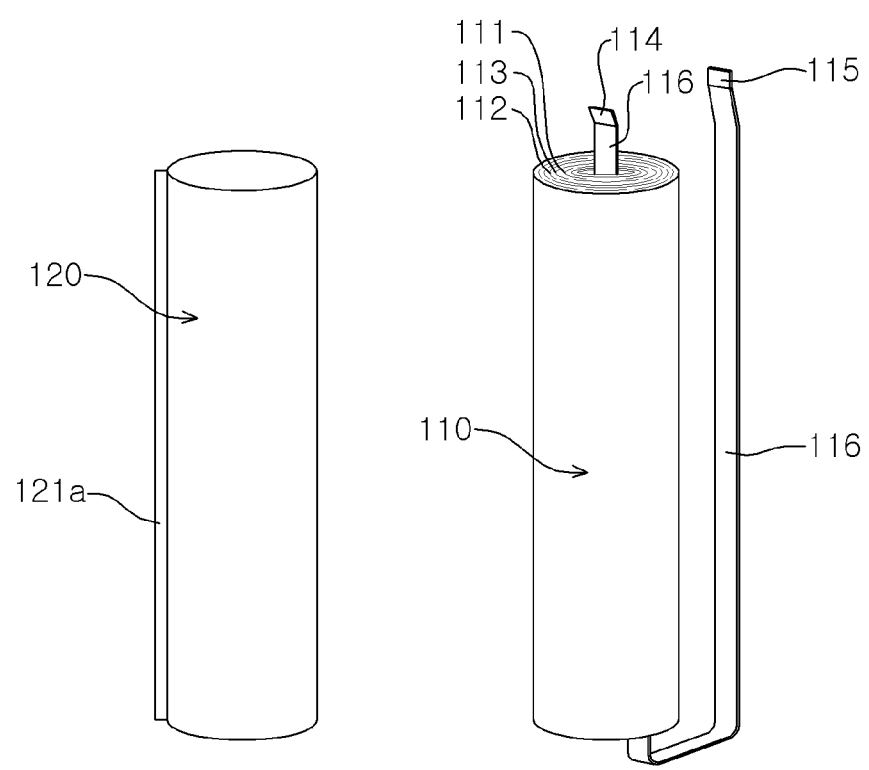
FIG. 1 is an exploded perspective view illustrating the construction of a cylindrical pouch-type bare cell according to a first embodiment of the present invention.

100: Cylindrical pouch-type bare cell
110: Jelly roll-type electrode assembly
111: First electrode
112: Second electrode
113: Separator
114: First electrode tab
115: Second electrode tab
116: Insulation tape
120: Cylindrical pouch
121a: Long-axis side
121b: First short-axis side
121c: Second short-axis side
200, 201, 202, 203: Protection circuit module
300, 301, 302, 303: Outer case
310: External terminal assembly
311: External terminal fixing cap
312a, 312b: External terminal fixing groove
313: External positive terminal
314: External negative terminal
315: External terminal compartment
316: External terminal fixing tongue
317: Outer electrode tab-receiving hole
318: Insulation tape
319a, 319b: Outer electrode tab
320: Protection circuit module compartment
321: Rear cap
400, 401, 402, 403: Lithium secondary battery pack
500, 501, 502, 503: Charging holder
511: Positive charging terminal
512: Negative charging terminal
520: External DC power input socket
530: Indicating lamp for charging or fully-charged

BEST MODE

Reference will now be made in greater detail to an exemplary embodiment of the present invention, an example of which is illustrated in the accompanying drawings. Wherever possible, the same reference numerals will be used throughout the drawings and the description to refer to the same or like parts.

Figure 2:
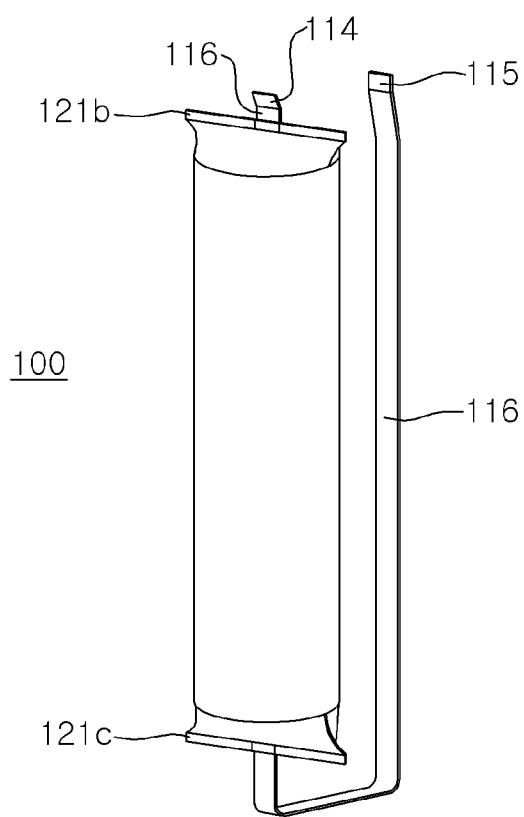
FIG. 2 is a perspective view illustrating appearance of the assembled cylindrical pouch-type bare cell according to the first embodiment of the present invention.

FIG. 1 is an exploded perspective view illustrating the construction of a cylindrical pouch-type bare cell according to a first embodiment of the present invention; and FIG. 2 is a perspective view illustrating appearance of the assembled cylindrical pouch-type bare cell according to the first embodiment of the present invention.

With reference to FIGS. 1 and 2, a cylindrical pouch-type bare cell 100 according to the first embodiment of the present invention includes a jelly roll-type electrode assembly 110 and a cylindrical pouch 120 that accommodates the jelly roll-type electrode assembly 110 therein.

The jelly roll-type electrode assembly 110 includes a first electrode 111 coated with any one electrode material (for example, a positive electrode material according to the present embodiment) of a positive electrode material and a negative electrode material, a second electrode 112 coated with a remaining one electrode material (for example, negative electrode material according to the present embodiment) of the positive electrode material and the negative electrode materials, and a separator 113 that is interposed between the first electrode 111 and the second electrode 112 to prevent the first electrode 111 and the second electrode 112 from being short-circuited and to allow only lithium ions to pass therethrough. A first electrode tab 114 serving as a positive electrode tab is bonded to the first electrode 111 and extends to protrude from the first electrode 111 by a predetermined length. A second electrode tab 115 serving as a negative electrode tab is bonded to the second electrode 112 and extends to protrude from the second electrode 112. The jelly roll-type electrode assembly 110 further includes an insulation tape 116 that is prevents short-circuit among the first electrode tab 114, the second electrode tab 115, and the cylindrical pouch 120.

The cylindrical pouch 120 is a multi-layered film including an aluminum foil layer and synthetic resin layers that cover respective surfaces of the aluminum foil layer. For this reason, a bare cell manufactured using this pouch is much lighter than a bare cell manufactured using a metal can. In addition, the cylindrical pouch-type bare cell 100 can be manufactured using the jelly roll-type electrode assembly 110 that has been used to manufacture 14500 standards metal can-type cylindrical bare cells. The cylindrical pouch-type bare cell 100 manufactured in this way is inserted into an enbloc clip-type outer case 300 with R6 standards unlike a bare cell manufactured using a metal can. As a result, a lithium secondary battery pack 400 of the present invention can be manufactured.

A long-axis side 121a of the cylindrical pouch 120 is heated to be welded and sealed, and then the jelly roll-type electrode assembly 110 is inserted into the cylindrical pouch 120 having a pouch shape. Next, a second short-axis side 121c through which the second electrode tab 115, which extends up to an outside passes, is heated to be welded and sealed. Next, a non-aqueous electrolyte is filled through a first short-axis side 121b, which is yet open and through which the first electrode tab 114 protruding outward by a predetermined length passes. Finally, the first short-axis side 121b is heated to be welded and sealed. Through all these processes, the cylindrical pouch-type bare cell 100 is produced.

The first electrode tab 114 and the second electrode tab 115 extend to an outside from the first short-axis side and the second short-axis side of cylindrical pouch 120. The first electrode tab 114 and the second electrode tab 115 are electrically connected to a protection circuit module 200 having a circuitry pattern thereon, thereby stopping the flow of current if malfunctioning occurs.

Figure 3:
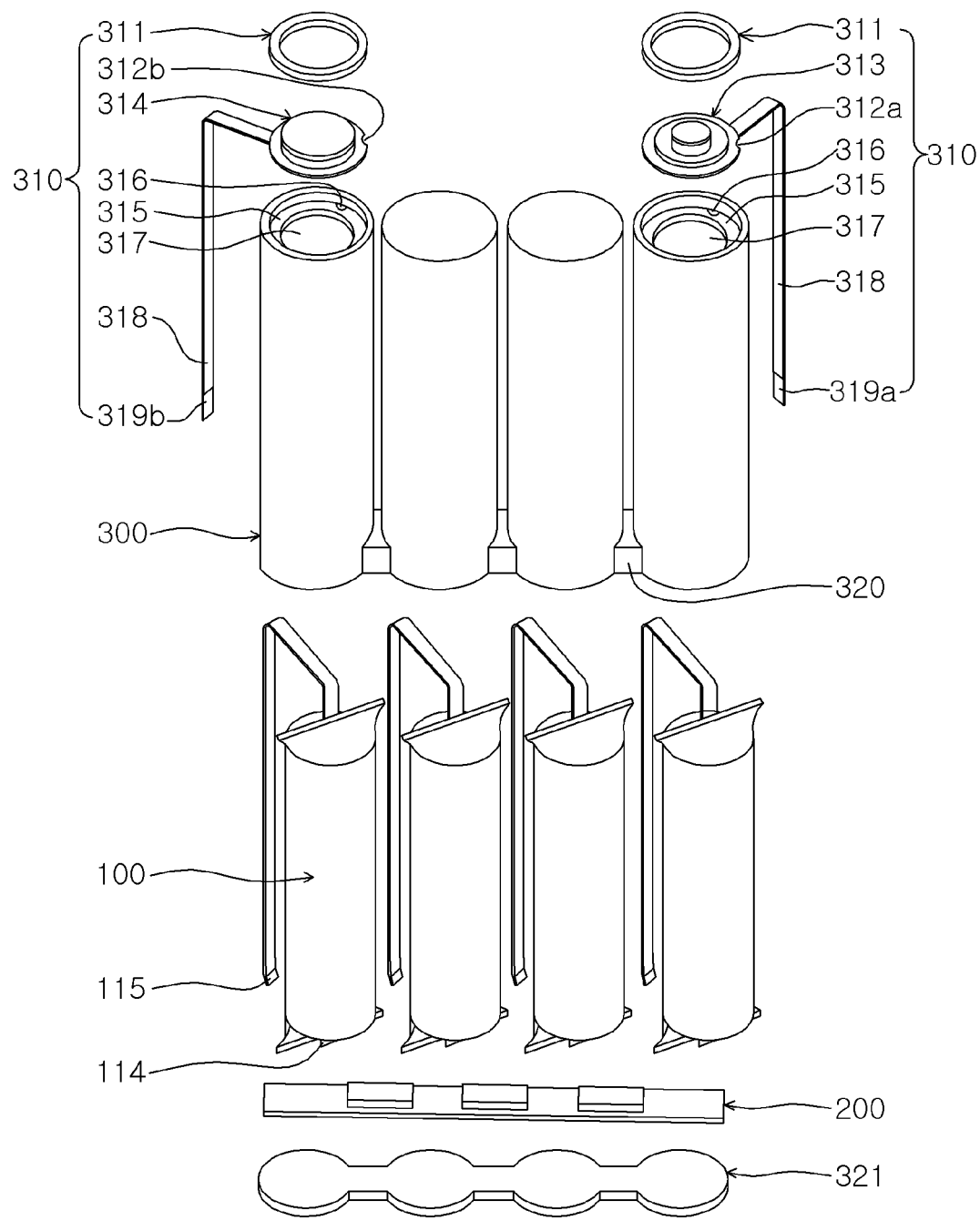
FIG. 3 is an exploded perspective view illustrating the construction of a lithium secondary battery pack according to the first embodiment of the present invention.
Figure 4:
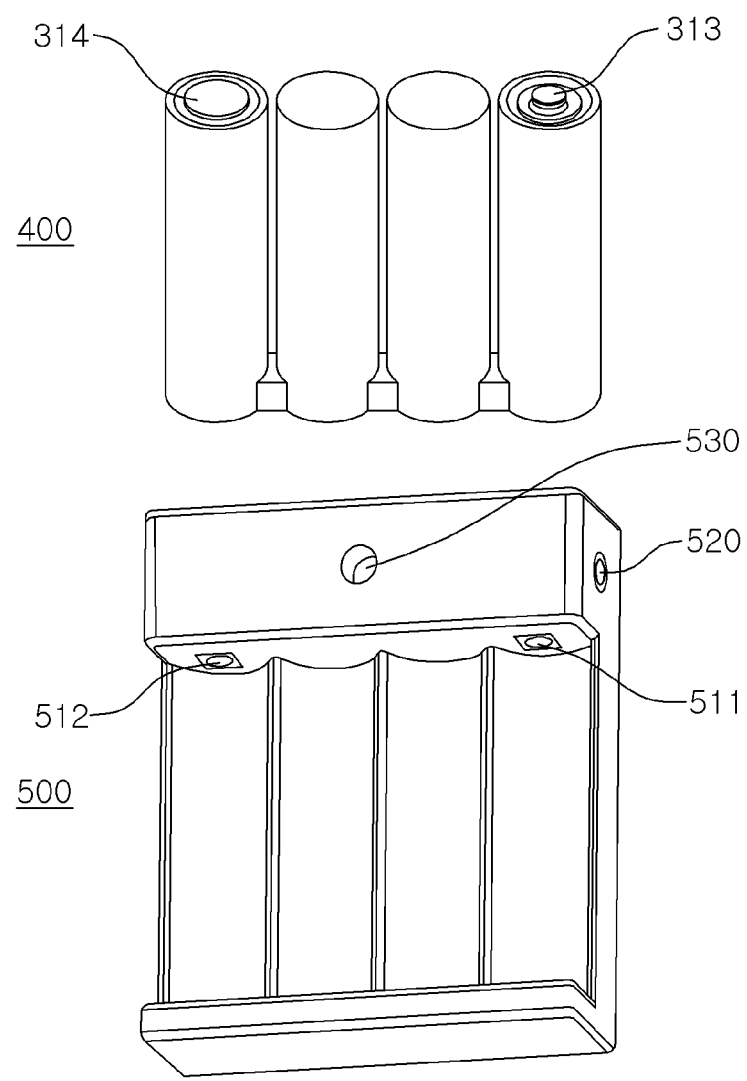
FIG. 4 is a perspective view illustrating appearance of the assembled lithium secondary battery pack according to the first embodiment of the present invention, and a charging holder.

FIG. 3 is an exploded perspective view illustrating the construction of a lithium secondary battery pack according to the first embodiment of the present invention; and FIG. 4 is a perspective view illustrating appearance of the assembled lithium secondary battery pack according to the second embodiment of the present invention, and a dedicated charging holder.

With reference to FIGS. 3 and 4, an enbloc clip-type lithium secondary battery pack 400 according to the first embodiment of the present invention includes four cylindrical pouch-type bare cells 100, a protection circuit module 200, and an enbloc clip-type outer case 300 that accommodates the cylindrical pouch-type bare cells 100 and the protection circuit module 200 therein. The enbloc clip-type outer case 300 is made up of an external terminal assembly 310, a protection circuit module compartment 320, and a rear cap 321.

The external terminal assembly 310 includes: an external terminal fixing cap 311 that is hollow inside, thereby allowing an external terminal to be electrically connected to an outside therethrough; an external positive terminal 313 that has an external terminal fixing groove 312a and to which an external terminal tab 319a having an elongated shape is electrically connected; an external negative terminal 314 that has an external terminal fixing groove 312b and to which an external terminal tab 319b having an elongated shape is electrically connected; and an external terminal compartment 315 that has an external terminal fixing tongue 316 and an outer electrode tab-receiving hole 317 and with which the external positive terminal 313 or the external negative terminal 314 is combined to fit snugly.

An insulation tape 318 may be included to prevent the outer electrode tabs 319a and 319b from being short-circuited. The outer electrode tab 319a electrically connected to the external positive terminal 313 and the outer electrode tab 319b electrically connected to the external negative terminal 314 are electrically connected to the protection circuit module 200 on which a circuitry pattern is formed, thereby stopping the flow of current if malfunctioning occurs.

Any one of the external positive terminal 313 and the external negative terminal 314, for example, the outer electrode tab 319b that is electrically connected to the external negative terminal 314, is inserted into an inside through the left outer electrode tab-receiving hole 317 of the enbloc clip-type outer case 300. Next, the external terminal fixing groove 312b provided to the external negative terminal 314 is aligned with the external terminal fixing tongue 316 and then the external negative terminal 314 is mounted in the external terminal compartment 315. Next, the external terminal fixing cap 311 is attached, thereby forming an assembled structure, and the assembled structure is molded with a hot-melt silicon adhesive. However, the molding material is not limited to the hot-melt silicon adhesive. Next, the outer electrode tab 319a that is electrically connected to the external positive terminal 313 is inserted into an inside through the right outer electrode tab-receiving hole 317 of the enbloc clip-type outer case 300. Next, the external terminal fixing groove 312a provided to the external positive terminal 313 is aligned with the external terminal fixing tongue 316 and then the external positive terminal 313 is mounted in the external terminal compartment 315. Next, an external terminal fixing cap 311 is attached, thereby forming an assembled structure, and then the assembled structure is molded. The external terminal fixing grooves 312a and 312b and the external terminal fixing tongues 316 prevent the external positive terminal 313 and the external negative terminal 314 from being deformed or damaged when the terminals are rotated.

Four cylindrical pouch-type bare cells 100 are inserted into four cylinder-shaped reception portions formed in the enbloc clip-type outer case 300, respectively, such that first electrode tabs 114 and the second electrode tabs 115 face the protection circuit module 200. After that, an outer electrode tap 319a electrically connected to an external positive terminal 313, an outer electrode tab 319b electrically connected to an external negative terminal 314, and respective four first electrode tabs 114 and respective four second electrode tabs 115 that are connected to the four cylindrical pouch-type bare cells 100 are electrically connected to the protection circuit module 200. Next, the protection circuit module 200 is aligned with and mounted to the protection circuit module compartment 320. Next, a rear cap 321 is attached to the assembled structure and then molded with a hot-melt silicon adhesive. Through all these processes, an enbloc clip-type lithium secondary battery pack 400 is completely manufactured.

The enbloc clip-type outer case 300 is manufactured as an integrated body through pressure injection molding of polycarbonate that is durable, has good temperature characteristics, and is strongly resistant to external impact. However, the material of the outer case 300 is not limited thereto.

A dedicated charging holder 500 that is configured to be combined snugly with an enbloc clip-type lithium secondary battery pack 400 includes a positive charging terminal 511 electrically connected to the external positive terminal 313, a negative charging terminal 512 electrically connected to the external negative terminal 314 of the enbloc clip-type lithium secondary battery pack 400, an external DC power input socket 520, an indicating lamp for charging or fully-charged 530, and an internal charging circuit.

Figure 5:
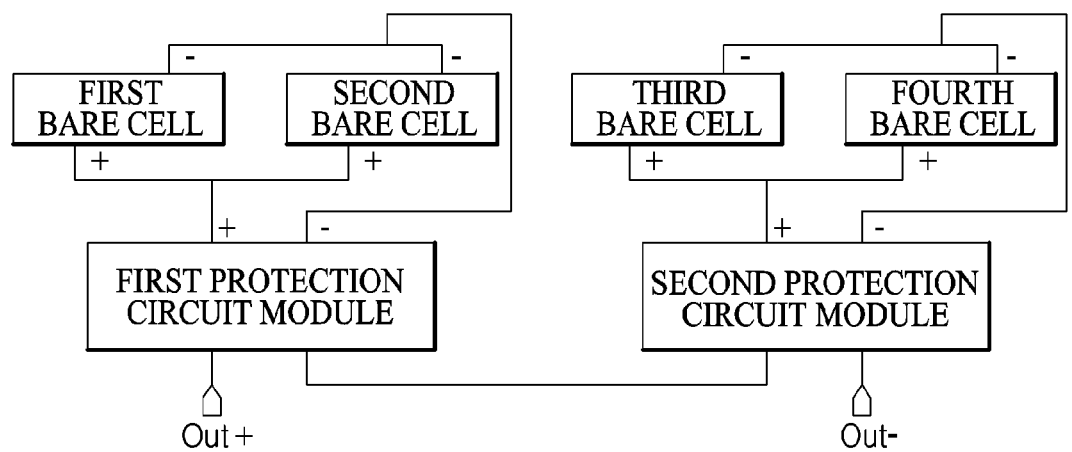
FIG. 5 is a circuit block diagram illustrating an internal circuit according to the first embodiment of the present invention.

FIG. 5 is a circuit block diagram illustrating an internal circuit according to the first embodiment of the present invention.

With reference to FIG. 5, an enbloc clip-type lithium secondary battery pack 400 according to the first embodiment of the present invention has a 2-series & 2-parallel (2S2P) circuit including four cylindrical pouch-type bare cells 100 and two protection circuit modules. When bare cells of an enbloc clip-type lithium secondary battery pack 400 are lithium-ion batteries or lithium-ion polymer batteries, the rated voltage is 7.4 V and can supply a voltage ranging from 5.6 to 8.4 V. When the bare cells are lithium iron phosphate (LiFePO4) batteries, the rated voltage is 6.4 V and can supply a voltage ranging from 5.6 to 7.2 V. The protection circuit module prevents overcharging and over-discharging and stops the flow of current if malfunctioning occurs.

Hereinafter, a lithium secondary battery pack and a dedicated charging holder therefor according to a second embodiment of the present invention will be described. The lithium secondary battery pack according to this embodiment is the same as the lithium secondary battery pack according to the first embodiment except for the following description.

Figure 6:
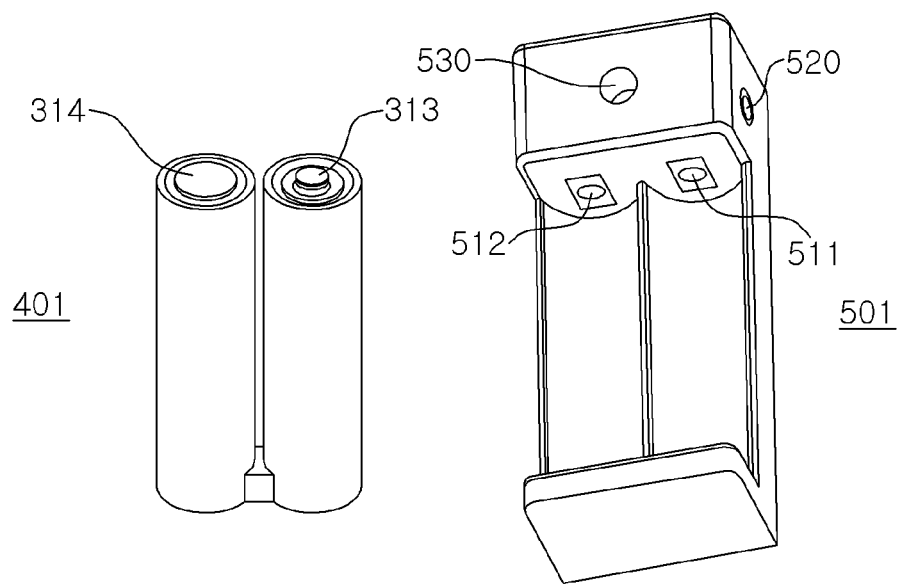
FIG. 6 illustrates a perspective view illustrating a lithium secondary battery pack that is assembled and a charging holder, and illustrates a circuit block diagram illustrating an internal circuit, according to a second embodiment of the present invention.
Figure 6:
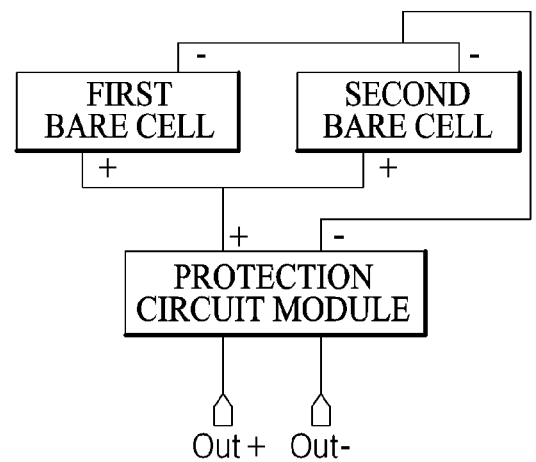

FIG. 6 illustrates a perspective view of a lithium secondary battery pack that is assembled and a dedicated charging holder therefore according to the second embodiment and also illustrates a circuit block diagram illustrating an internal circuit.

With reference to FIG. 6, an enbloc clip-type lithium secondary battery pack 401 according to the second embodiment includes two cylindrical pouch-type bare cells 100, a protection circuit module 201, and an enbloc clip-type outer case 301 that accommodates the cylindrical pouch-type bare cells 100 and the protection circuit module 201 therein. The enbloc clip-type lithium secondary battery pack 401 is combined to fit snugly with a dedicated charging holder 501.

The enbloc clip-type lithium secondary battery pack 401 according the present embodiment has a 2-parallel (2P) circuit formed by two cylindrical pouch-type bare cells 100 and one protection circuit module 201. When bare cells of the enbloc clip-type lithium secondary battery pack 401 are lithium-ion batteries or lithium-ion polymer batteries, the rated voltage is 3.7 V and can supply a voltage ranging from 2.8 to 4.2 V. When bare cells of the enbloc clip-type lithium secondary battery pack 401 are lithium iron phosphate (LiFePO4) batteries, the rated voltage is 3.2 V and can supply a voltage ranging from 2.8 to 3.6 V.

Hereinafter, a lithium secondary battery pack according to a further embodiment will be described. The lithium secondary battery pack according to the present embodiment is the same as that of the first embodiment except for the following description.

Figure 7:
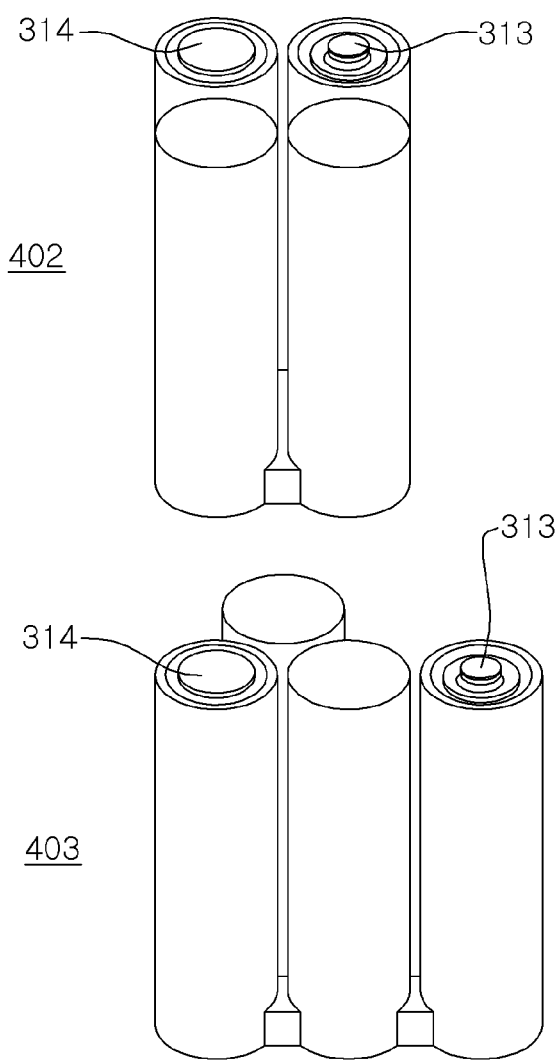
FIG. 7 is a perspective view illustrating examples of lithium secondary batteries according to other embodiments of the present invention.

FIG. 7 is a perspective view illustrating appearance of a lithium secondary battery pack that is assembled according to a further embodiment.

With reference to FIG. 7, an enbloc clip-type lithium secondary battery pack 402 or 403 includes four cylindrical pouch-type bare cells 100, a protection circuit module 202 or 203, and an enbloc clip-type outer case 302 or 303. The enbloc clip-type outer case 302 or 303 accommodates the cylindrical pouch-type bare cells 100 and the protection circuit module 202 or 203 therein. A dedicated charging holder 502 or 503 may be manufactured. The enbloc clip-type lithium secondary battery pack 402 or 403 fits snugly into the dedicated charging holder 502 or 503.

As described above, the present invention is not limited to any one of the preferred embodiments described above and the ordinarily skilled in the art will appreciate that various alternatives, modifications, and equivalents are possible without departing from the scope of the invention defined as in the following claims.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An enbloc clip-type lithium secondary battery pack capable of fitting snugly into a two-cell or four-cell battery compartment of the electronic devices, the lithium secondary battery pack comprising:

a cylindrical pouch-type bare cell (100) including a cylindrical jelly roll-type electrode assembly (110) and a cylindrical pouch (120) that accommodates the cylindrical jelly roll-type electrode assembly (110) therein, the cylindrical jelly roll-type electrode assembly (110) including a first electrode tab (114) and a second electrode tab (115), in which the first electrode tab (114) protrudes by a predetermined length, the second electrode tab (115) is elongated by a length longer than the length of the first electrode tab (114), the first electrode tab (114) is bonded to a first electrode (111) coated with any one of a positive electrode material and a negative electrode material, and the second electrode tab (115) is bonded to a second electrode (112) coated with a remaining one of the positive electrode material and the negative electrode material, in which the first electrode tab (114) and the second electrode tab (115) are located in opposite positions, and in which when the second electrode tab (115) is folded in a direction toward the first electrode tab (114), the heights of the first electrode tab (114) and the second electrode tab (115) become same;

an enbloc clip-type outer case (300) structured such that one ends of several cylindrical outer cases are continuously connected to each other by a protection circuit module compartment (320), in which the several cylindrical outer cases accommodate the respective cylindrical pouch-type bare cells (100) therein, and the protection circuit module compartment (320) connects the one ends of the several cylindrical outer cases to each other;

a protection circuit module (200) that is electrically connected to the first electrode tab (114) and the second electrode tab (115), wherein the first electrode tab (114) and the second electrode tab (115) is installed in the respective several cylindrical pouch-type bare cells (100), and after each of the cylindrical pouch-type bare cells (100) are inserted and installed in the respective several cylindrical outer cases such that the first electrode tab (114) and the second electrode tab (115) are directed toward the protection circuit module compartment (320), in which the second electrode tab (115) is folded in the direction toward the first electrode tab (114); and a pair of external terminal assemblies (310) including an external positive terminal (313) or an external negative terminal (314) and individually including outer electrode tabs (319*a* and 319*b*), wherein the external positive terminal (313) and the external negative terminal (314) are received in the enbloc clip-type outer case (300), and each of the outer electrode tabs (319*a* and 319*b*) is electrically connected to the external positive terminal (313) or the external negative terminal (314), and the outer electrode tabs (319*a* and 319*b*) are inserted into the enbloc clip-type outer case (300), and each of the outer electrode tabs (319*a* and 319*b*) is electrically connected to the protection circuit module (200).

2. The enbloc clip-type lithium secondary battery pack capable of fitting snugly into a two-cell or four-cell battery compartment of the electronic devices, according to claim 1, wherein each of the pair of external terminal assemblies (310) includes an external terminal fixing groove (312*a* or 312*b*) and an external terminal fixing tongue (316) that are engaged snugly with each other, wherein the external terminal fixing grooves (312*a* or 312*b*) are provided on each of the external positive terminal (313) and the external negative terminal (314), and the external terminal fixing tongues (316) are provided on the enbloc clip-type outer case (300).

3. The enbloc clip-type lithium secondary battery pack capable of fitting snugly into a two-cell or four-cell battery compartment of the electronic devices, according to claim 1, wherein each of the pair of external terminal assemblies (310) includes an external terminal compartment (315) in which the external positive terminal (313) or the external negative terminal (314) is inserted.

4. The enbloc clip-type lithium secondary battery pack capable of fitting snugly into a two-cell or four-cell battery compartment of the electronic devices, according to claim 3, wherein each of the pair of external terminal assemblies (310) includes an external terminal fixing cap (311) that is combined snugly with both the external positive terminal (313) or the external negative terminal (314) and the external terminal compartment (315).

5. The enbloc clip-type lithium secondary battery pack capable of fitting snugly into a two-cell or four-cell battery compartment of the electronic devices, according to claim 1, wherein the protection circuit module compartment (315) is equipped with the protection circuit module (200).

6. The enbloc clip-type lithium secondary battery pack capable of fitting snugly into a two-cell or four-cell battery compartment of the electronic devices, according to claim 5, wherein the protection circuit module compartment (320) further includes a rear cap (321) that is combined snugly with the protection circuit module compartment (320) after the protection circuit module (200) has been inserted into the protection circuit module compartment (320).

* * * * *